United States Patent [19]

Singh et al.

[11] 4,090,990

[45] May 23, 1978

[54] PROCESS FOR PREPARING POLYFORMALS IN THE PRESENCE OF AN ORGANIC EPOXIDE

[75] Inventors: Ajaib Singh; Samuel Kaizerman, both of Somerville, N.J.

[73] Assignee: American Cyanamid Company, Stamford, Conn.

[21] Appl. No.: 752,386

[22] Filed: Dec. 20, 1976

Related U.S. Application Data

[60] Continuation of Ser. No. 561,588, Mar. 24, 1975, abandoned, which is a division of Ser. No. 486,141, Jul. 5, 1974, abandoned, which is a continuation of Ser. No. 351,680, Apr. 16, 1973, abandoned.

[51] Int. Cl.$^2$ .............................................. C08G 4/00
[52] U.S. Cl. ............................ 260/18 PF; 260/45.8 A; 260/67 FP
[58] Field of Search .......... 260/67 FP, 45.8 A, 18 PF

[56] References Cited

U.S. PATENT DOCUMENTS

| | | | |
|---|---|---|---|
| 2,485,160 | 10/1949 | Niederhauser et al. | 260/18 PF |
| 2,786,067 | 3/1957 | Frostick, Jr. et al. | 260/45.8 A |
| 3,055,871 | 9/1962 | Heffler et al. | 260/77.5 |
| 3,183,211 | 5/1965 | Brinker et al. | 260/67 FP |
| 3,210,318 | 10/1965 | Dolce et al. | 260/67 FP |
| 3,271,369 | 9/1966 | Kern et al. | 260/67 FP |
| 3,419,531 | 12/1968 | Trischler | 260/67 FP |

*Primary Examiner*—Eugene C. Rzucidlo
*Attorney, Agent, or Firm*—Frank M. Van Riet

[57] ABSTRACT

An improved process for preparing polyformals is provided which comprises condensing an aliphatic diol, in which the hydroxyl groups are separated by at least four carbon atoms, with an essentially stoichiometric amount of formaldehyde in the presence of a Bronsted acid catalyst and contacting the condensation product with an organic epoxide in an amount sufficient to react with the residue of said catalyst.

5 Claims, No Drawings

PROCESS FOR PREPARING POLYFORMALS IN THE PRESENCE OF AN ORGANIC EPOXIDE

This application is a continuation of our abandoned application Ser. No. 561,588, filed Mar. 24, 1975, which, in turn, is a division of abandoned application Ser. No. 486,141, filed July 5, 1974, which, in turn, is a continuation of abandoned application Ser. No. 351,680, filed Apr. 16, 1973.

Generally stated, the subject matter of the present invention relates to an improved process for preparing polyformals. More particularly, the invention relates to a process for removing the acid catalyst residues from polyformals and to the preparation of stable isocyanate terminated polyurethane prepolymers prepared from the polyformals.

BACKGROUND OF THE INVENTION

It is known that polyols such as polyesters and polyethers are basic intermediates in the preparation of polyurethanes. While polyformals have been known as polyurethane intermediates, they have not been widely employed in commercial applications. Polyformals are prepared by the reaction of aliphatic diols and formaldehyde under the influence of acid catalysts; thus, poly-1,6-hexaneformal is made by reaction of a slight excess of 1,6-hexanediol with formaldehyde in the presence of an acid catalyst such as p-toluene sulfonic acid, the reaction is carried out until substantially all the theoretical amount of water has been removed.

When this polyformal is used without further treatment to prepare a polyurethane prepolymer by reaction with an organic diisocyanate, the prepolymer becomes orange to red in color, which carries over to the subsequent reaction product. Moreover, on standing especially at temperatures above normal room temperatures, there is a distinct drop in the isocyanate content of the prepolymer and an increase in the viscosity oftentimes resulting in gelation. The reactions accompanying this instability appear to be complex and probably involve the formation of undesired by-products as a result of a secondary reaction. Thus, the prepolymers prepared from the polyformals are usually unstable.

The prepolymers are subsequently converted by chain-extension reaction to give elastomers, plastics and the like. Polyurethanes obtained by chain-extension with diols or triols have been found to be thermally unstable, losing much of their mechanical properties on exposure to elevated temperatures. Amine cured polymers, while ordinarily more thermally stable are badly colored. However, it is difficult to prepare a good polyurethane polymer by chain-extension of an unstable prepolymer with an aromatic diamine.

As hereinabove set forth, the polyformals are prepared by the condensation of an aliphatic diol with formaldehyde in the presence of an acid catalyst, with the elimination of water. In practice, the diol is used in slight excess over formaldehyde to insure hydroxyl group termination and to control the molecular weight. Although 1,6-hexanediol is of particular interest, other aliphatic diols can be used to make polyformals, such as those containing at least four atoms between the hydroxyl groups, preferably five atoms; these include, for example, 1,4-butanediol, 1,5-pentanediol, diethylene glycol, 1,7-heptanediol, and the like, as well as higher homologs. The formaldehyde is usually an aqueous solution of formaldehyde. Concentrated solutions of formaldehyde, that is, 37 percent or higher, tend to be unstable and polymerize. Thus, they usually contain a stabilizer or are kept hot to prevent polymerization. A concentrated solution of formaldehyde, 44 percent, can be made stable at room temperature by dissolving an equimolar amount of a diol into the solution. Effective use of such a stock solution can be advantageous in the preparation of polyformals since one need only add any excess amounts of diol and a catalyst to prepare a polyformal reaction mixture.

The polyformal condensation reaction is catalyzed by acids. The acids useful in preparing the polyformals of the present invention include Bronsted acids, that is species which can give up a proton to another species such as p-toluene sulfonic acid which is the preferred species of catalyst. Others include sulfuric acid, hydrochloric acid, phosphoric acid, methane sulfonic acid, napththalene sulfonic acid, and the like.

Ordinarily when the polyformal reaction is completed, the polymer is light yellow and has an apparent pH of about 3.4 to 3.6. When the polyformal is converted into a prepolymer by reaction with an organic diisocyanate, the color becomes orange to red, and on standing the isocyanate content decreases with an accompanying increase in the viscosity, frequently resulting in gelation.

The present invention represents the culmination of a long series of investigations, conducted largely by the inventors, directed to uncovering means for overcoming the inherent disadvantages of isocyanate terminated polyurethane prepolymers prepared from polyformals.

Accordingly, it is a primary object of the present invention to provide an improved process for polyformals which provide stable isocyanate terminated prepolymers and thermally stable polyurethane polymers.

It is another object of the invention to provide a process for removing the acid catalyst residues from polyformals.

It is yet another object of the invention to provide stable isocyanate terminated polyurethane prepolymers obtained from polyformals.

Generally then, it is an object of this invention to provide an improved process for preparing polyformals which possess none of the inherent disadvantages of the prior art polyformals.

Additional objects and advantages of the invention will be set forth in part in the description which follows, and in part will be obvious from the description, or may be realized by practice of the invention, the objects and advantages being realized and attained by means of the methods, processes, instrumentalities and combinations particularly pointed out in the appended claims.

THE INVENTION

To achieve the foregoing objects and in accordance with its purpose as embodied and broadly described, the present invention relates to an improved process for preparing polyformals which comprises condensing an aliphatic diol, in which the hydroxyl groups are separated by at least four carbon atoms, with an essentially stoichiometric amount of formaldehyde in the presence of a Bronsted acid catalyst and contacting the condensation product with an organic epoxide in an amount sufficient to react with the residue of said acid catalyst.

In addition, the invention relates to improved isocyanate terminated polyurethane prepolymers obtained from the polyformals prepared according to the present invention, as well as the polyurethane polymers prepared from said prepolymers.

It is to be understood that both the foregoing general description and the following detailed description are exemplary and explanatory and are not restrictive of the invention.

The addition of the organic epoxide following completion of the polyformal reaction results in retention of color and stabilization of isocyanate content and viscosity of the prepolymer. It has also been found that the addition of the epoxide increases the apparent pH to neutrality or near neutrality.

A wide variety of epoxides are useful in producing polyformal prepolymers with improved color and stability, including the simplest epoxides, ethylene oxide and propylene oxide. While the simplest epoxides do not provide optimal thermal stability to the ultimate polyurethanes, they are nevertheless effective to some extent, providing better stability than the unstabilized polymer.

The epoxides useful in the present invention to stabilize the polyurethane against thermal degradation include such diverse epoxides as styrene oxide; vinyl cyclohexane diepoxide; diglycidyl ethers of aliphatic diols, such as diglycidyl ether of 1,4-butanediol; epoxidized soybean oil; diglycidyl ether of isopropylidenebisphenol (DER-332, Dow Chemical Co.); compounds having the formula:

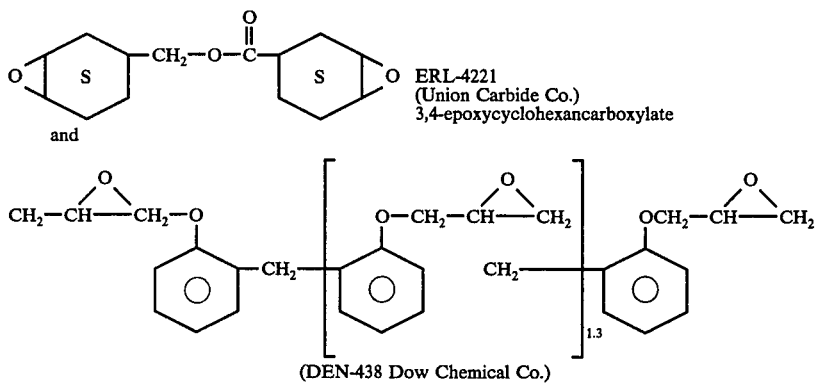

The preferred epoxides are 3,4-epoxycyclohexanecarboxylate and epoxidized soybean oil.

The amount of epoxide used is not critical so long as there is a sufficient amount to react with the acid catalyst residues. A slight excess is preferred, but larger amounts can be used without, having any additional beneficial or adverse effect.

The epoxide is generally added to the polyformal following completion of the polyformal condensation reaction. It may also be added, to the polyformal prior to the addition of the organic diisocyanate in the preparation of the polyurethane prepolymer.

The following examples are provided for illustrative purposes and may include particular features of the invention.

However, the examples should not be construed as limiting the invention, many variations of which are possible without departing from the spirit or scope thereof.

EXAMPLE I

A. PREPARATION OF POLY-1,6-HEXANEFORMAL

A suitable reaction vessel equipped for distillation is charged with a stock solution containing equimolar amounts of 1,6-hexanediol and 44 percent aqueous formaldehyde. Sufficient 1,6-hexanediol is then added to bring the ratio of hexanediol/formaldehyde to about 1.04–1.08. To this is added 0.1 percent by weight of p-toluenesulfonic acid and then reaction is conducted under 15 mm Hg, with continual removal of water, for about 8–10 hours at temperatures of from 25° C. to 90° C. Following completion of the reaction, the molecular weight of the polyformal is about 1000 to 1100, viscosity about 800 to 1000 centipoises, apparent pH about 3.4 to 3.6, and the concentration of water (Karl Fisher) is about 0.1 percent or less.

B. ADDITION OF EPOXY STABILIZERS

Following completion of the polyformal reaction various epoxy compounds are incorporated into the polymer at a level of 1 percent by weight and stirred in at about 70° C. The temperature is then reduced to about 40° C. and the apparent pH measured.

C. PREPARATION OF POLYURETHANE PREPOLYMER

The polyformal containing the epoxy additives is mixed at about 40° C. with 2,4-tolylene diisocyanate, using a ratio of 1.7 moles of diisocyanate per mole of polyformal. On completion of the diisocyanate addition, the mixture is heated with stirring at about 70° C. for several hours to complete the prepolymer forming reaction.

D. PREPARATION OF A POLYURETHANE

The isocyanate content of the prepolymer is determined and then reacted with a stoichiometric amount of trimethylolpropane (TMP) at about 100° C. The mixture is then poured into a cavity mold and cured into a sheet 6 feet × 6 0.075 inches by heating for about 16 hours.

E. EVALUATION OF THERMAL STABILITY BY CONTINUOUS STRESS RELAXATION

The TMP cross-linked polymer was tested for thermal stability using a six-channel, autographic stress-relaxometer. This instrument consists of load sensing elements, a means for extending and maintaining the specimens at a constant elongation, and a circulating air oven. The oven temperature is maintained at a temperature of 120° C. ± 0.1° C. and the samples extended to 5 ± 0.05 percent. The decrease in the modulus with time, which is due to thermal degradation, is recorded automatically by the instrument. Data relating to the relative thermal stability are obtained from plots of $f(t)/f(0)$ versus log time, or log $f(t)/f(0)$ versus time, where $f(t)$ and $f(0)$ are the forces at time $t$ and $t=0$, respectively, required to maintain the sample at a given elongation. The data in the following table are reported at $T_{50}$, which is the time at 120° C. required for the sample to degrade to a value equal to 50 percent of the initial stress. This is a measure of the amount of degradation experienced by the sample. The rate of stress-decay observed thru stress-relaxation measurements can be directly related to the rate of chemical chain scission reactions responsible for the degradation of the samples.

It is necessary for continuous stress-relaxation studies to have a network structure. The results are readily translated to linear structures.

F. PREPOLYMER STABILIZATION

A polyformal having a molecular weight of 1030 was reacted with 2,4-tolylene diisocyanate at an NCO/OH ratio of 1.75/1. Prior to addition of the diisocyanate, one portion of the polyformal was stirred for 3 hours at 70° C. with 1 percent of ERL-4221. After the addition of the diisocyanate the remaining portion of the prepolymer without the epoxide was dark red. Both prepolymers were stored at 70° C for 2 weeks to determine the stability of the prepolymer. After 2 weeks, the control dropped in isocyanate content from 4.72 to 3.77 percent (20 percent) whereas the prepolymer containing the epoxide dropped only to 4.64 percent (1.7 percent).

The data in the table illustrate the effectiveness of the various epoxides in (1) increasing the pH of the polyformal to neutrality and (2) greatly increasing the stability of the subsequent polyurethanes to thermal degradation.

TABLE
STABILIZATION OF POLYFORMAL POLYURETHANES WITH EPOXIDES

| Sample | Treatment Time Hours at 70° C.[1] | pH | Prepolymer NCO Theory | Prepolymer NCO Found | $T_{50}$ (Min.), TMP Cures, 120° C. |
|---|---|---|---|---|---|
| CONTROL | — | 3.4 | 5.05 | 4.74 | 240 |
| ARALDITE RD-2[2] | 0.5 | 6.1 | 4.82 | 4.86 | 1600 |
|  | 24 | 7.0 | 4.68 | 4.69 | 2100 |
| ERL-4206[3] | 0.9 | 6.9 | 4.69 | 4.74 | 2500 |
|  | 24 | 7.1 | 4.55 | 4.64 | 2600 |
| ERL-4221 | 3 | 7.0 | 4.72 | 4.64 | 2100 |
| FLEXOL EPO[4] | 24 | 6.2 | 4.72 | 4.61 | 1800 |
| ETHYLENE OXIDE | 5 min. | 7.1 |  |  |  |

[1]Before preparation of isocyanate terminated prepolymer
[2]DIGLYCIDYLETHER OF 1,4-BUTANEDIOL (CIBA)
[3]VINYL CYCLOHEXENE DIEPOXIDE (UNION CARBIDE)
[4]EPOXIDIZED SOYBEAN OIL (UNION CARBIDE)

We claim:
1. In a process for preparing a polyformal which comprises condensing an aliphatic diol, in which the hydroxyl groups are separated by at least four carbon atoms, with an essentially stoichiometric amount of formaldehyde in the presence of a Bronsted acid catalyst, the improvement which comprises contacting the condensation product thus formed with an organic epoxide in an amount sufficient to react with the residue of said acid catalyst, whereby said acid residue is removed from said polyformal.

2. The process according to claim 1 wherein the aliphatic diol is 1,6-hexanediol.

3. The process according to claim 1 wherein the acid catalyst is p-toluenesulfonic acid.

4. The process according to claim 1 wherein the organic epoxide is 3,4-epoxycyclohexanecarboxylate.

5. The process according to claim 1 wherein the organic epoxide is epoxidized soybean oil.

* * * * *